(12) United States Patent  
Park et al.

(10) Patent No.: US 10,195,487 B2  
(45) Date of Patent: Feb. 5, 2019

(54) GOLF BALL COVER COATING COMPOSITION AND GOLF BALL USING THE SAME

(71) Applicant: VOLVIK INC., Chungcheongbuk-do (KR)

(72) Inventors: Sang Woork Park, Seoul (KR); Byun Hoon Kang, Chungcheongbuk-do (KR); Kyung Ahn Moon, Seoul (KR); Seung Jun Park, Seoul (KR)

(73) Assignee: VOLVIK INC., Chungcheongbuk-do (KR)

( * ) Notice: Subject to any disclaimer, the term of this patent is extended or adjusted under 35 U.S.C. 154(b) by 0 days.

(21) Appl. No.: 15/563,145

(22) PCT Filed: Dec. 9, 2016

(86) PCT No.: PCT/KR2016/014421  
§ 371 (c)(1),  
(2) Date: Sep. 29, 2017

(87) PCT Pub. No.: WO2017/099505  
PCT Pub. Date: Jun. 15, 2017

(65) Prior Publication Data  
US 2018/0093137 A1    Apr. 5, 2018

(30) Foreign Application Priority Data  
Dec. 9, 2015  (KR) .......... 10-2015-0175357  
Dec. 8, 2016  (KR) .......... 10-2016-0166966

(51) Int. Cl.
| | | |
|---|---|---|
| C09D 175/06 | (2006.01) | |
| A63B 37/00 | (2006.01) | |
| C09D 7/40 | (2018.01) | |
| C09D 167/02 | (2006.01) | |
| C08G 18/68 | (2006.01) | |
| C08G 18/70 | (2006.01) | |
| C08G 18/79 | (2006.01) | |
| C08G 18/42 | (2006.01) | |

(52) U.S. Cl.  
CPC .......... *A63B 37/0022* (2013.01); *C08G 18/42* (2013.01); *C08G 18/4252* (2013.01); *C08G 18/4277* (2013.01); *C08G 18/68* (2013.01); *C08G 18/706* (2013.01); *C08G 18/792* (2013.01); *C09D 7/69* (2018.01); *C09D 167/02* (2013.01); *C09D 175/06* (2013.01)

(58) Field of Classification Search  
None  
See application file for complete search history.

(56) References Cited

U.S. PATENT DOCUMENTS

| | | | |
|---|---|---|---|
| 5,409,233 A | 4/1995 | Kennedy | |
| 5,766,097 A | 6/1998 | Horiuchi et al. | |
| 5,967,906 A * | 10/1999 | Horiuchi | A63B 37/0003 473/356 |
| 6,063,487 A * | 5/2000 | Azechi | C08K 3/22 428/325 |
| 6,398,669 B1 | 6/2002 | Yokota et al. | |
| 6,444,740 B1 * | 9/2002 | DeCato | C08K 3/22 427/387 |
| 7,297,750 B2 | 11/2007 | Ishino | |
| 7,893,150 B2 | 2/2011 | Nefzger et al. | |
| 9,033,826 B2 | 5/2015 | Fitchett et al. | |
| 9,168,423 B2 | 10/2015 | Toshiyuki et al. | |
| 9,259,618 B2 | 2/2016 | Toshiyuki et al. | |
| 2005/0106317 A1 * | 5/2005 | Shino | B41M 5/502 427/180 |
| 2009/0298617 A1 | 12/2009 | Egashira et al. | |
| 2013/0313693 A1 * | 11/2013 | Burns | C08G 59/4064 257/666 |
| 2014/0364824 A1 * | 12/2014 | Ota | A61L 15/42 604/372 |
| 2015/0283431 A1 | 10/2015 | Bender et al. | |

FOREIGN PATENT DOCUMENTS

| | | |
|---|---|---|
| CN | 1712472 A | 12/2005 |
| CN | 102266658 A | 12/2011 |
| CN | 103239837 A | 8/2013 |
| CN | 103480128 A | 1/2014 |
| JP | H07-31695 A | 2/1995 |
| JP | H07-194733 A | 8/1995 |
| JP | 2001-29512 A | 2/2001 |
| JP | 2002-159596 A | 6/2002 |

(Continued)

OTHER PUBLICATIONS

Covestro brochure "Polyisocyanates and Prepolymers" (Year: 2017).*  
Bayer Material Science "The Chemistry of Polyurethane Coatings" (2005) pp. 1-29. (Year: 2005).*  
International Search Report corresponding to PCT/KR2016/014421, dated May 4, 2017, five pages.  
Written Opinion corresponding to PCT/KR2018/014421, dated May 8, 2017, seven pages.  
Notice of Non-Final Rejection corresponding to KR 10-2016-0166966 dated Mar. 7, 2017.  
Notice of Allowance corresponding to KR 10-2016-0166966 dated Jun. 15, 2017.

(Continued)

*Primary Examiner* — David J Buttner  
(74) *Attorney, Agent, or Firm* — Kilpatrick Townsend & Stockton LLP

(57) ABSTRACT

Provided is a golf ball manufactured using a golf ball cover coating composition that reduces the influence of external light on a golfer during outdoor use due to low surface gloss and reduces damage to the surface of the golf ball caused by external impact due to excellent impact resistance and cutting resistance. The golf ball cover coating composition may include a base and a hardener. The base may include a modified polyester polyol resin and inorganic particles. The hardener may include a polyisocyanate resin having at least two isocyanate groups.

14 Claims, 14 Drawing Sheets

(56) References Cited

FOREIGN PATENT DOCUMENTS

| | | | |
|---|---|---|---|
| JP | 2003-20445 A | | 1/2003 |
| JP | 2005-330368 A | | 5/2004 |
| JP | 2009285460 A | | 12/2009 |
| JP | 2011-251135 A | | 3/2012 |
| KR | 95-005343 B1 | | 7/1991 |
| KR | 10-2008-0088256 A | | 10/2008 |
| KR | 2008088256 | * | 10/2008 |
| KR | 10-1317907 B1 | | 10/2013 |
| KR | 10-2015-0095216 A | | 8/2015 |
| TW | 201538205 A | | 10/2015 |
| WO | WO2008/088770 A1 | | 7/2008 |
| WO | WO-2016/201062 | * | 12/2016 |

OTHER PUBLICATIONS

Samji Chemteck., Co, LTD, "High Technology", "Falltting Efficiency in Aminoalkyd Black", Retrieved from: http://www.samjichem.com/sub_kor/sub_03_01_01.php.

Non-Final Rejection for Japanese Patent Application No. 2017-552174 dated May 15, 2018, all pages.

* cited by examiner

| Profile1 | Horz. dist. | Hght. diff. |
|---|---|---|
| Seg.1 | 1155.66um | 38.41um |

Profile 1
Line type : Horz.
Ave : None
Correction : Smooth intensity None, DCL/BCL None, Smooth height None, Correct bit None
Ref. value1 : 531.49 um
Ref. value2 : 0.00 um
Step : 531.49 um Laser+Optical Optical Laser intensity Height Profile 1
Line type : Perp.
Ave : None
Correction : Smooth intensity None, DCL/BCL None,
Smooth height None, Correct bit Straight line (manual)
Ref. value1 : 480.96 um
Ref. value2 : 0.00 um
Step : 480.96 um

| Profile1 | Horz. dist. | Hight. diff. |
|---|---|---|
| Seg.1 | 495.60um | 66.90um |

Profile 1
Line type : Perp.
Ave : None
Correction : Smooth intensity None, DCL/BCL None,
Smooth height None, Correct bit None
Ref. value1 : 659.85 um
Ref. value2 : 0.00 um
Step : 659.85 um

GOLF BALL COVER COATING COMPOSITION AND GOLF BALL USING THE SAME

TECHNICAL FIELD

One or more embodiments relate to a golf ball cover coating composition and the golf ball manufactured using the same.

BACKGROUND ART

Structures of golf balls significantly affect the flight distance and the spin performance of golf balls. In general, golf balls are classified, according to structures thereof, into one-piece golf balls having a single-layered structure, two-piece golf balls having a double-layered structure including a core and a cover surrounding the core, three-piece golf balls having a triple-layered structure including a dual core and a cover, three-piece golf balls having a triple-layered structure including a core and a dual cover, four-piece golf balls including a core and a triple cover, four-piece golf balls including a dual core and a dual cover, and four-piece golf balls including a triple core and a cover.

Meanwhile, in addition to performance of the golf ball, the results of golf games are considerably influenced by a flight distance of the golf ball hit by a driver, the accuracy in a landing point of the golf ball hit by a driver, and the accuracy in putting on the green. Here, a golfer needs high concentration.

Since general purpose golf balls include a coating layer with a high reflectance of external light and a high gloss (i.e., glossy coating), external light may be reflected by the surface of a golf ball toward a golfer during outdoor use thereof. Thus, the reflected light may distract concentration of the golfer so as not to accurately hit the golf ball. Since the degree of reflection of external light toward the golfer varies depending on a position of the sun and a hitting stance of the golfer, it is difficult for the golfer to maintain a high degree of concentration.

DETAILED DESCRIPTION OF THE INVENTION

Technical Problem

One or more embodiments include a golf ball manufactured using a golf ball cover coating composition including inorganic particles used to reduce the surface gloss to prevent a golfer from being distracted by the surface gloss during a golf game and having excellent impact resistance and cutting resistance by applying flexibility to the golf ball to reduce the surface damage caused by external impacts without having reduction in performance (e.g., impact resistance and cutting resistance) caused by addition of the inorganic particles.

Technical Solution

According to one or more embodiments, a golf ball cover coating composition includes a base and a hardener, wherein the base comprises a modified polyester polyol resin and inorganic particles, and the hardener comprises an isocyanate resin having at least two isocyanate groups.

According to one or more embodiments, a golf ball is formed of the golf ball cover coating composition.

Advantageous Effects of the Invention

As described above, according to the one or more of the above exemplary embodiments, since the golf ball cover coating composition includes the base having the inorganic particles, the coating layer formed of the composition may have low external light reflectance and low gloss. Accordingly, the surface of the golf ball having the coating layer has very low gloss, thereby reducing influence of external light on a golfer during outdoor use thereof and increasing concentration and performance of the golfer.

Since the golf ball cover coating composition includes the base having the highly flexible modified polyester polyol resin, the coating layer formed of the composition may have excellent impact resistance, cutting resistance, scratch resistance, and rebound resilience. Thus, the golf ball having the coating layer may be less damaged by external impact, and accordingly flight distance and spin performance of the golf ball may be maintained regardless of hours of use.

BEST MODE

Figure 1:
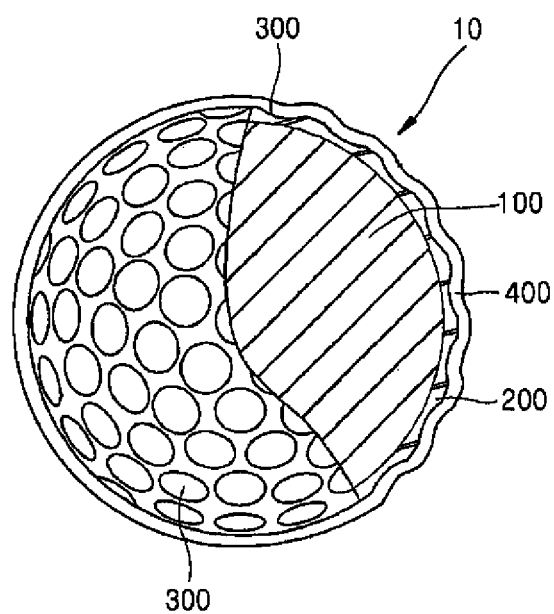
FIG. 1 is a schematic diagram illustrating a structure of a golf ball according to the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

As the invention allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the description of the present disclosure, certain detailed explanations of related art are omitted when it is deemed that they may unnecessarily obscure the essence of the invention.

While such terms as "first," "second," etc., may be used to describe various components, such components must not be limited to the above terms. The above terms are used only to distinguish one component from another.

The terms used in the present specification are merely used to describe particular embodiments, and are not intended to limit the present disclosure. An expression used in the singular encompasses the expression of the plural, unless it has a clearly different meaning in the context. In the drawings, elements may be exaggerated in size, omitted, or schematically illustrated for convenience and clarity of explanation, and sizes of the elements do not entirely reflect the actual sizes thereof.

Meanwhile, it will be understood that when one element is referred to as being "on" or "under" another element, it can be directly on or under the other element, or intervening elements may also be present therebetween. The positions of on and under are determined based on the drawings.

FIG. 1 is a schematic diagram illustrating a structure of a golf ball 10 according to the present invention. The golf ball 10 includes a core 100, a cover 200 on the core 100 and having a plurality of dimples 300, and a coating layer 400 on the cover 200. The coating layer 400 is formed using a golf ball cover coating composition. The golf ball cover coating composition will be described in more detail later.

The golf ball 10 may have a structure selected from a two-piece structure, a three-piece structure, a four-piece structure, and a five-piece structure.

The core 100 significantly affects a flight distance of the golf ball 10 due to rebound resilience of the core 100 when the golf ball 10 is hit.

The core 100 may be manufactured by heating a mixture of a base rubber, a cross-linking agent, and an initiator using a hot press.

The base rubber may be a polybutadiene rubber or a mixture of a polybutadiene rubber and bismuth.

The polybutadiene rubber may have a high cis-bond content. When the polybutadiene rubber having high cis-bond content is used to prepare the core 100, rebound resilience of the core 100, required by the golf ball 10, may be improved.

Bismuth has an expansibility of 3 to 3.5% at room temperature. When the base rubber includes bismuth, bismuth increases rebound resilience of the base rubber while shrinking at a high temperature (e.g., temperature higher than 100° C.) and expanding at room temperature. Thus, high rebound resilience may be obtained at a low hardness.

The cross-linking agent may include at least one selected from the group consisting of α,β-ethylenically unsaturated carboxylic acid having 3 to 8 carbon atoms and metal salts thereof.

The initiator may include at least one selected from the group consisting of dicumyl peroxide, 1,1-bis(t-butylperoxy)-3,3,5-trimethyl cyclohexane, 2,5-dimethyl-2,5-di(t-butylperoxy) hexane, and di-t-butylperoxide.

Although not shown in the drawings, the core 100 may have a single-layered or multi-layered structure (e.g., double-layered structure or triple-layered structure).

The core 100 is coated with the cover 200 having a plurality of dimples 300. The cover 200 protects the core 100 from an external environment, and flight characteristics of the golf ball 10 may be determined by the plurality of dimples 300 formed on the surface of the cover 200.

The cover 200 may be formed by directly injection-molding using a cover forming composition including a thermoplastic resin, a thermosetting resin, or a thermoplastic rubber on the core 100. Alternatively, the cover 200 may be formed by preparing a hollow shell using the cover forming composition and coating and compression-molding a plurality of hollow shells on the core 100.

The thermoplastic resin or the thermosetting resin may be selected from the group consisting of an ionomer resin, a polyester resin, a polyurethane resin, a polyamide resin, and any combination thereof.

The ionomer resin may be selected from the group consisting of HI-MILAN available from Mitsui Polychemical Co., Ltd., ESCOR available from EXXON Inc., HPC and SURLYN available from DUPONT Co., Ltd., and any combination thereof.

The polyurethane resin may be selected from the group consisting of a thermoplastic polyurethane resin, a thermosetting polyurethane resin, and any combination thereof.

The thermoplastic rubber may include at least one selected from the group consisting of styrene-butadiene-styrene (SBS) and styrene-ethylene/butylene-styrene (SEBS) triblock copolymer.

Although not shown in the drawings, the cover 200 may have a single-layered or multi-layered structure (e.g., double-layered structure or triple-layered structure).

The cover forming composition may further include an additive selected from the group consisting of a weight controller, a dispersant, an antioxidant, a UV absorbent, a photostabilizer, a dye, a pigment, and any combination thereof.

The plurality of dimples 300 is formed on the surface of the cover 200. The coating layer 400 is formed on the cover 200 having the plurality of dimples 300. The coating layer 400 includes the golf ball cover coating composition. For example, the coating layer 400 may be formed by coating the golf ball cover coating composition on the cover 200 and drying the golf ball cover coating composition at a temperature of 30 to 70° C. for 1 hour to 24 hours. The golf ball cover coating composition may be coated by the known methods, for example, by spray coating, spin coating, and dip coating.

The golf ball cover coating composition includes a base and a hardener.

The base includes a modified polyester polyol resin and inorganic particles. The modified polyester polyol resin is a base resin used as a base material of the golf ball cover coating composition. The modified polyester polyol resin is a resin in which a repeating unit derived from a given monomer is introduced into a main chain of the resin by adding the monomer (e.g., elasticity-imparting monomer) to the resin. The modified polyester polyol resin imparts flexibility and elasticity to the coating layer 400 including the golf ball cover coating composition to improve durability, cutting resistance, and scratch resistance.

The modified polyester polyol resin may include at least one selected from the group consisting of caprolactone modified polyester polyol, 1,3-butadiene modified polyester polyol, and polytetramethylene glycol modified polyester polyol.

The caprolactone modified polyester polyol resin may have a structure in which a repeating unit derived from caprolactone is introduced into a main chain of a polyester polyol resin. For example, the repeating unit derived from caprolactone may be represented by Formula 1 below, without being limited thereto.

Formula 1

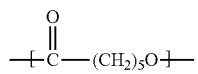

Since the caprolactone modified polyester polyol resin increases elasticity by introducing the repeating unit derived from caprolactone into the main chain of the polyester polyol resin, the coating layer 400 including the golf ball cover coating composition may have soft texture and high elasticity.

The caprolactone modified polyester polyol resin may include 14058 resin available from Chokwang Paint, Co., Ltd., without being limited thereto.

The modified polyester polyol resin may have a weight average molecular weight of 5,000 to 25,000 g/mol and a content of hydroxyl group (OH %) of 1.0 to 5.0% by mass.

In this specification, the content of hydroxyl group may be calculated according to Equation 1 below.

Content of hydroxyl group (OH %)=[(number of moles of hydroxyl group in hydroxyl group-containing modified polyester resin)*(17(molecular weight of OH))/(total mass of hydroxyl group-containing modified polyester resin (g))]*100.     Equation 1

When the weight average molecular weight of the modified polyester polyol resin is within this range, the coating layer including the golf ball cover coating composition may have elasticity, thereby, improving durability and cutting resistance.

The modified polyester polyol resin according to the present invention may have a weight average molecular weight of 11,000 to 12,000 g/mol and a content of hydroxyl group (OH %) of 1.5 to 2.0% by mass.

A content of the modified polyester polyol resin may be in the range of 25 to 85 parts by weight based on 100 parts by weight of a total content of the base. For example, the content of the modified polyester polyol resin may be in the range of 40 to 70 parts by weight based on 100 parts by weight of the total content of the base. When the content of the modified polyester polyol resin is within this range, the coating layer including the golf ball cover coating composition may have elasticity, thereby improving durability and cutting resistance.

The modified polyester polyol resin may be prepared by maintaining a mixture of a polybasic acid, a polyhydric alcohol, a given monomer (e.g., elasticity-imparting monomer), and a solvent in a reactor at 150° C. for 30 minutes, increasing the temperature of the reactor to 220° C., and maintaining the mixture for 4 to 5 hours.

The polybasic acid may include at least one selected from the group consisting of aromatic dibasic acid and esters thereof, and aliphatic dibasic acid and esters thereof.

The aromatic dibasic acid may include at least one selected from the group consisting of 1,4-cyclohexane dicarboxylic acid, phthalic anhydride, and isophthalic acid.

An alkyl ester of the aromatic dibasic acid may include at least one selected from the group consisting of dimethyl terephthalate, dimethyl isophthalate, diethyl terephthalate, diethyl isophthalate, dibutyl terephthalate, and dibutyl isophthalate.

An alkyl ester of the aliphatic dibasic acid may include at least one selected from the group consisting of alkyl esters of aliphatic dibasic acids such as fumaric acid, maleic acid, adipic acid, itaconic acid, gultaconic acid, succinic acid, and citraconic acid.

A content of the polybasic acid may be in the range of 15 to 20 parts by weight based on 100 parts by weight of a total weight of the mixture.

The polyhydric alcohol may include at least one selected from the group consisting of aromatic diol, aliphatic diol, aromatic triol, and aliphatic triol.

The aromatic diol may include at least one selected from the group consisting of polyoxyethylene-(2,0)-2,2-bis(4-hydroxyphenyl)propane, polyoxypropylene-(2,0)-2,2-bis(4-hydroxyphenyl)propane, polyoxypropylene-(2,2)-polyoxyethylene-(2,0)-2,2-bis(4-hydroxyphenyl)propane, polyoxyethylene-(2,3)-2,2-bis(4-hydroxyphenyl)propane, polyoxypropylene-(6)-2,2-bis(4-hydroxyphenyl)propane, polyoxypropylene-(2,3)-2,2-bis(4-hydroxyphenyl)propane, polyoxypropylene-(2,4)-2,2-bis(4-hydroxyphenyl)propane, polyoxypropylene-(3,3)-3,3-bis(4-hydroxyphenyl)propane, polyoxyethylene-(3,0)-2,2-bis(4-hydroxyphenyl)propane, and polyoxyethylene-(6)-2,2-bis(4-hydroxyphenyl)propane.

The aliphatic diol may include at least one selected from the group consisting of ethylene glycol, diethylene glycol, triethylene glycol, 1,2-propylene glycol, 1,2-propanediol, 1,4-butanediol, 1,4-butenediol, 2,3-butanediol, 1,5-pentanediol, 2,3-pentanediol, 1,6-hexanediol, 2,3-hexanediol, 3,4-hexanediol, 1,7-heptanediol, dodecanediol, 1,4-cyclohexane dimethanol, 1,4-cyclohexanediol, and neopentyl glycol.

The aliphatic triol may include trimethylol propane.

The given monomer is introduced into the main chain of the modified polyester polyol resin to increase elasticity. Accordingly, the coating layer including the golf ball cover coating composition may have soft texture and high elasticity.

The polyester polyol resin may have a weight average molecular weight of 6,500 to 7,500 g/mol.

The polyester polyol resin may include 14058 resin available from Chokwang Paint, Co., Ltd., without being limited thereto.

The given monomer may include caprolactone, glycol, polycarbonate, and any combination thereof.

The caprolactone may include Capa™2101A available from Perstorp, Inc.

A content of the given monomer may be in the range of 55 to 60 parts by weight based on 100 parts by weight of the total weight of the mixture.

The solvent may include at least one selected from the group consisting of ethyl acetate, butyl acetate, isobutyl acetate, methylethyl ketone, methyl isobutyl ketone, diisobutyl ketone, methylamyl ketone, xylene, and toluene.

A content of the solvent may be in the range of 10 to 15 parts by weight based on 100 parts by weight of the total weight of the mixture.

The base may include inorganic particles. Since external light is diffusely reflected by a coating layer including the golf ball cover coating composition having the inorganic particles, the surface of the golf ball may have reduced gloss. For example, the coating layer including the golf ball cover coating composition having the inorganic particles may have a matt surface.

The inorganic particles may include powdered silica particles having an average particle diameter of 1 to 15 µm. For example, the inorganic particles may include powdered silica particles having an average particle diameter of 1 to 2 µm.

As used herein, the average particle diameter refers to a cumulative average particle diameter D50 at 50% of a total cumulative particle diameter distribution graph from the smallest particle diameter. The average particle diameter D50 may be measured using methods well known in the art, for example, using a particle size analyzer or transmission electron microscopy (TEM) or scanning electron microscope (SEM) images. Alternatively, the average particle diameter D50 may be easily obtained by measuring diameters of particles via dynamic light-scattering, counting the number of particles belonging to each size range via data analyzing, and calculating the average particle diameter D50.

The silica particles may have a specific surface area of 100 to 200 $m^2/g$ measured by the Brunauer Emmett Teller (BET) method. For example, the silica particles may have a specific surface area of 130 to 180 $m^2/g$ measured by the BET method. For example, the silica particles may have a specific surface area of 130 to 150 $m^2/g$ measured by the BET method. For example, the silica particles may have a specific surface area of 150 to 180 $m^2/g$ measured by the BET method. For example, if the specific surface of the silica particles is less than 100 $m^2/g$, a matting effect may be negligible. For example, if the specific surface of the silica particles is greater than 200 $m^2/g$, viscosity of a solution including the silica particles may increase or the golf ball may have a non-uniform surface resulting in decrease in the flight distance.

The silica particles may include Nipsil E-220A available from TOSOH Inc.

The inorganic particles may further include at least one wax selected from the group consisting of carnauba wax, montan wax, ester wax, polyethylene wax, polypropylene wax, and fluorocarbon resin wax. When the inorganic particles further include the wax, the silica particles may be coated with the wax.

The inorganic particles may further include at least one selected from the group consisting of oxides of metals and semimetals such as $Al_2O_3$, $AlPO_4$, MgO, $TiO_2$, $ZrO_2$, and $Fe_2O_3$, natural minerals such as montmorillonite, attapulgite, bentonite, palygorskite, smectite, hormite, diatomite, white clay, silica, limestone, Kaolinite, clay, talc, agalmatolite, perlite, sodium silicate, sodium aluminum silicate, magnesium aluminum silicate, silica hydrogel, silica gel, fumed silica, precipitated silica, alumina zeolite, moleculars, and reversed phase silica, processed and activated mineral-based inorganic oxides, organic particles such as low molecular polyethylene fine particles and medium molecular polyethylene fine particles, and aluminum stearate, in addition to the silica particles.

A content of the inorganic particles may be in the range of 5 to 20 parts by weight based on 100 parts by weight of a total weight of the base. For example, the content of the inorganic particles may be in the range of 8 to 10 parts by weight based on 100 parts by weight of the total weight of the base. When the content of the inorganic particles is within this range, a coating layer including the golf ball cover coating composition having the inorganic particles may have a sufficient matting effect.

According to an embodiment, the base may further include a first solvent. The first solvent may include at least one selected from the group consisting of an aromatic hydrocarbon solvent, a ketone solvent, and an ester solvent.

The aromatic hydrocarbon solvent may include at least one selected from the group consisting of xylene and toluene. The ketone solvent may include at least one selected from the group consisting of methylethyl ketone, methylisobutyl ketone, diisobutyl ketone, and methylamyl ketone. The ester solvent may include at least one selected from the group consisting of ethylacetate, butylacetate, and isobutylacetate.

A content of the first solvent may be in the range of 20 to 40 parts by weight based on 100 parts by weight of the total weight of the base.

The base may further include 1 to 15 parts by weight of a first additive based on 100 parts by weight of the total weight of the base.

The first additive may include at least one selected from the group consisting of an antifoaming agent, a leveling agent, a curing accelerator, and a precipitation stabilizer.

The base according to the present invention may further include 0.01 to 0.1 parts by weight of the antifoaming agent, 1.0 to 1.5 parts by weight of the leveling agent, 0.5 to 1.0 parts by weight of the curing accelerator, and 8 to 10 parts by weight of the precipitation stabilizer based on 100 parts by weight of the total weight of the base.

The base may further include 1 to 20 parts by weight of the elasticity-imparting agent based on 100 parts by weight of the total weight of the base. The elasticity-imparting agent may impart elasticity and a self-resilient effect to the base to further improve elasticity of the coating layer including the golf ball cover coating composition and improve cutting resistance by returning to the original shape thereof from damages.

The elasticity-imparting agent may include at least one selected from the group consisting of polybutadiene rubber, polystyrene rubber, polyurethane rubber, silicon modified urethane resin, silicon modified polyester resin, polyester modified silicon resin, and silicon modified epoxy resin.

The base may be prepared by mixing the modified polyester polyol resin, the first solvent, and the first additive using a known stirrer, such as an impeller mixer, and adding the inorganic particles to the mixture. The modified polyester polyol resin, the first solvent, the first additive, and the inorganic particles are described above.

The hardener may include an isocyanate resin having at least two isocyanate groups and a second solvent.

The isocyanate resin refers to a compound having at least two isocyanate groups in the molecular structure thereof. The isocyanate group of the isocyanate resin reacts with a hydroxyl group of the modified polyester polyol resin (e.g., urethane reaction) to form a urethane bond (—NHCOO—). Accordingly, a polymer network is formed to provide durability to the coating layer including the golf ball cover coating composition.

The isocyanate resin may include at least one selected from the group consisting of 2,4-toluene diisocyanate (2,4-TDI), 2,6-toluene diisocyanate (2,6-TDI), diphenylmethane-4,4'-diisocyanate (4,4'-MDI), diphenylmethane-2,4-diisocyanate (2,4-MDI), diphenylmethane-2,2'-diisocyanate (2,2'-MDI), 1,6-hexamethylene diisocyanate (1,6-HDI), 2,2,4(2,4,4)-trimethyl hexamethylene diisocyanate (2,2,4(2,4,4)-TMDI), ρ-phenylene diisocyanate (PPDI), 4,4'-dicyclohexyl methane diisocyanate (HMDI), m-xylene diisocyanate (XDI), isophorone diisocyanate (IPDI), 1,5-naphthalene diisocyanate (NDI), trans-1,4-cyclohexyl diisocyanate (CHDI), isocyanurate modified hexamethylene diisocyanate, and polyether modified hexamethylene diisocyanate.

The isocyanate resin may include at least one selected from the group consisting of Burnock DN955 available from DIC Co., Ltd., Desmodur N3300 and Bayhydur 3100 available from Bayer MaterialScience Company. The content of isocyanate group (NCO %) of the isocyanate resin may be in the range of 5 to 23% by mass.

In the present specification, the content of isocyanate group may be represented by Equation 2 below.

Content of isocyanate group (NCO %)=[(The number of moles of isocyanate group in polyisocyanate compound)*(42(molecular weight of NCO))/(total mass of polyisocyanate compound (g))]*100    Equation 2

The content of the isocyanate resin may be in the range of 30 to 75 parts by weight based on 100 parts by weight of a total weight of the hardener. When the content of isocyanate group of the isocyanate resin is within this range, the hardener may be efficiently involved in reactions with the base to constitute a strong polymer network, and accordingly improving durability of the coating layer.

The second solvent may include at least one selected from the group consisting of an aromatic hydrocarbon solvent, a ketone solvent, and an ester solvent.

The aromatic hydrocarbon solvent may include at least one selected from the group consisting of xylene and toluene. The ketone solvent may include at least one selected from the group consisting of methylethyl ketone, methylisobutyl ketone, diisobutyl ketone, and methylamyl ketone. The ester solvent may include at least one selected from the group consisting of ethylacetate, butylacetate, and isobutylacetate.

The content of the second solvent may be in the range of 20 to 70 parts by weight based on 100 parts by weight of the total weight of the hardener.

The hardener may include an isocyanate resin having at least two isocyanate groups and the second solvent.

The hardener may further include 0.1 to 1 part by weight of a second additive based on 100 parts by weight of the total weight of the hardener.

The second additive may include an antifouling agent.

The hardener according to the present invention may further include 0.3 to 0.5 parts by weight of the antifouling agent based on 100 parts by weight of the total weight of the hardener.

The hardener may be prepared by mixing the isocyanate resin, the second solvent, and the second additive using a known stirrer, such as an impeller mixer.

The golf ball cover coating composition may be prepared by mixing the base and the hardener using a known stirrer, such as an impeller mixer, at a speed of 200 to 300 rpm at room temperature for 10 minutes.

The golf ball cover coating composition may further include a diluent. The diluent may adjust viscosity of the golf ball cover coating composition such that the golf ball cover coating composition is efficiently coated on the surface of the golf ball. The diluent may include methylethyl ketone.

A weight ratio of the base to the hardener may be in the range of 5:1 to 1:1. For example, the weight ratio of the base to the hardener may be 3:1. When the weight ratio of the base to the hardener is within this range, the coating layer including the golf ball cover coating composition may have excellent durability, impact resistance, cutting resistance, and scratch resistance.

According to the present invention, a ratio of the content of hydroxyl group (OH %) of the base to the content of isocyanate group (NCO %) of the hardener may be in the range of 1:0.8 to 1:1.2.

When the golf ball cover coating composition further includes the diluent, a ratio of the base:the hardener:the diluent may be in the range of 3:1:2, without being limited thereto.

A golf ball having the coating layer formed using the golf ball cover coating composition may have a gloss of 0.1 to 20 measured at 60° using a Micro-TRI Gloss meter available from BYK Inc. in accordance with the ASTM D523 method. For example, the golf ball may have a gloss of 1 to 10 measured at 60° in accordance with ASTM D523 method.

The golf ball cover coating composition includes the base including the modified polyester polyol resin and the inorganic particles. Thus, the golf ball having the coating layer including the golf ball cover coating composition has a reduced gloss since external light is diffusely reflected by the surface of the golf ball. As a result, influence of external light on the golfer may be reduced during outdoor use. In addition, since the coating layer of the golf ball including the golf ball cover coating composition has increased elasticity, durability and cutting resistance of the golf ball are improved. Thus, surface damage caused by external impact may be reduced, and accordingly flight distance and spin performance of the golf ball may be maintained even after long term use.

The coating layer 400 according to the present invention may include an upper coating layer, a lower coating layer between the cover 200 and the upper coating layer, and a printed layer between the lower coating layer and the upper coating layer. The upper coating layer may include the golf ball cover coating composition.

The upper coating layer according to the present invention may include a product of urethane reaction between the modified polyester polyol resin of the base and the isocyanate resin of the hardener.

The lower coating layer increases adhesion of the cover 200 to the printed layer formed on the lower coating layer and the upper coating layer and may be generally formed of aqueous polyurethane acrylate by emulsion dipping or spraying to a thickness of 1 to 20 μm.

The printed layer is a layer on which a product name for recognition of the product and, usually, a putting line (auxiliary line for aiming during putting) are printed. A logo of a company, a product name, and the like may be printed by transfer printing, pad printing, inkjet printing, or the like.

The upper coating layer provides the golf ball with an aesthetically appealing appearance and protects the surface of the golf ball from external impact. The upper coating layer according to the present invention may be formed by coating the golf ball cover coating composition by a spray gun and drying at a temperature of 30° C. to 50° C.

The upper coating layer according to the present invention may have a thickness of 5 to 20 μm.

Figure 6A:
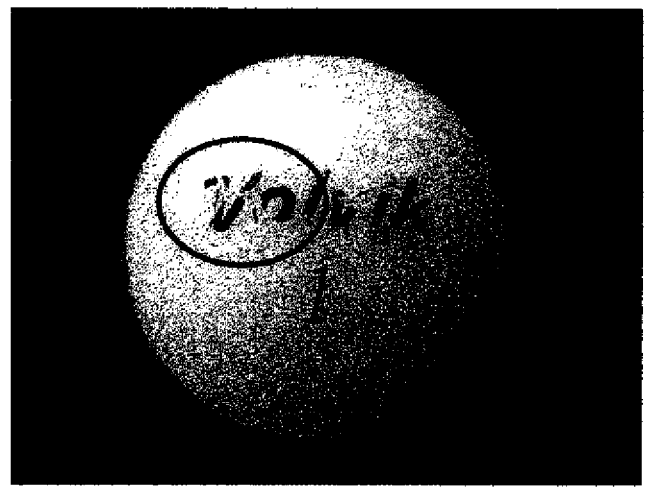
FIG. 6A is a photograph of a surface of a golf ball prepared according to Comparative Example 7 obtained by using the camera (IXUS 145, Canon), after a professional golfer hits the golf ball at a speed of 75 mph at a logo portion three times using a nine iron.
Figure 7:
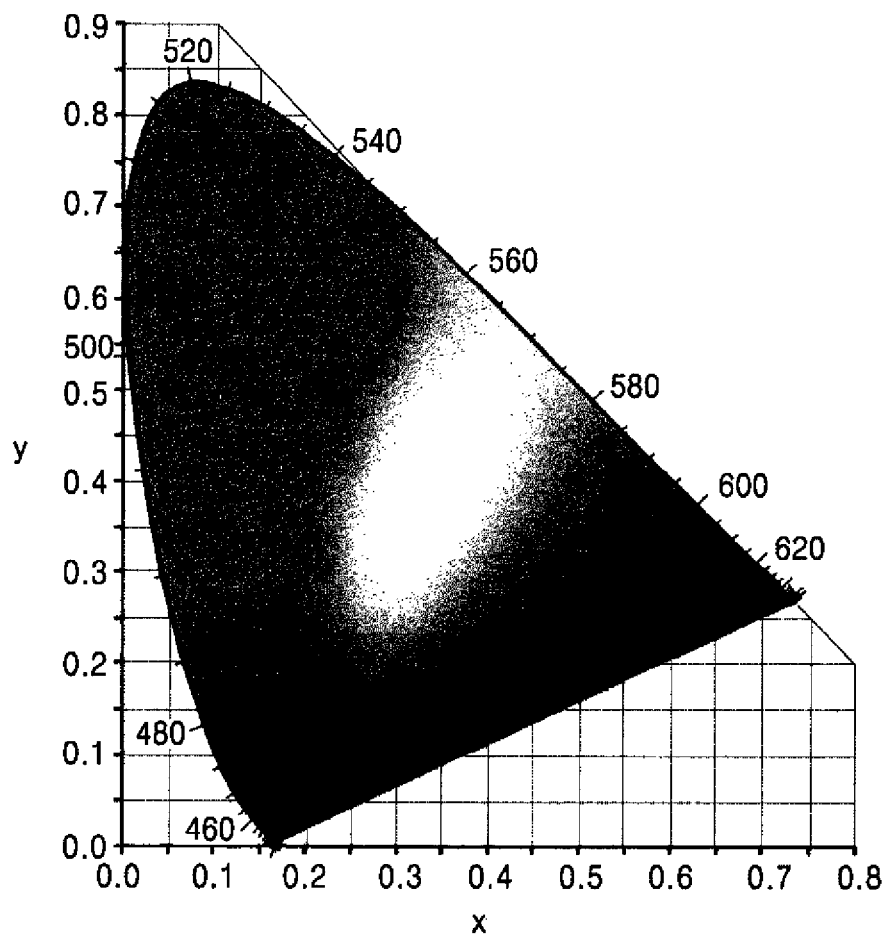
FIG. 7 is a CIE 1931 color space chromaticity diagram.

A golf ball having a coating layer formed of the golf ball cover coating composition may have a color defined by x and y coordinates of the CIE 1931 color space chromaticity diagram illustrated in FIG. 7 or any mixed color of at least two colors. For example, the golf ball may have colors illustrated in FIGS. 3A, 3B, 4A, 5A, and 6A. For example, the color of the golf ball may be white, yellow, yellowish green, black, brown, orange, red, blue, green, pink, gray, or any mixed color of at least two thereof. However, the color of the golf ball is not limited thereto and may be any color defined as a point selected from the CIE 1931 color space chromaticity diagram and any mixed color of at least two thereof well known in the art. The golf ball may further include a component emitting fluorescence and phosphorescence to have an aesthetically appealing appearance.

MODE OF THE INVENTION

Examples

Examples 1 to 7 and Comparative Examples 1 to 7

Preparation of Base for Golf Ball Cover Coating Composition

A mixture of a base resin, a first solvent, and a first additive was added to an impeller mixer and stirred at 1,000 rpm to prepare each of the bases for golf ball cover coating compositions. Types and contents of ingredients used to prepare the bases of the golf ball cover coating compositions are shown in Table 1. In Table 1, a unit of the ingredients is parts by weight.

TABLE 1

| | Ingredients | | Base 1 for golf ball cover coating composition | Base 2 for golf ball cover coating composition | Base 3 for golf ball cover coating composition |
|---|---|---|---|---|---|
| Base resin | Caprolactone modified polyester polyol resin | | 48 | — | — |
| | Polyester polyol resin | | — | 53 | 50 |
| First additive | Inorganic particles | | 9 | — | 9 |
| | Antifoaming agent | | 0.01 | 0.01 | 0.01 |
| | Leveling agent | | 1.2 | 1.0 | 1.2 |
| | Curing accelerator | | 0.6 | — | 0.6 |
| | Precipitation stabilizer | | 6 | — | 8 |
| First solvent | Aromatic hydrocarbon solvent | Xylene | — | 10 | — |
| | | Toluene | 10 | 10 | 8 |
| | Ketone solvent | Methylisobutyl ketone | 10 | 10 | 8 |
| | Ester solvent | N-butyl acetate | 5 | — | 5 |
| | | Ethyl acetate | 10.19 | 15.99 | 10.19 |

*caprolactone modified polyester polyol resin (14058 resin, Chokwang Paint, Co., Ltd., weight average molecular weight: 11,000~12,000 g/mol, OH %: 1.5~2.0%, solid content: 75~80%)
* polyester polyol resin (14040 resin, Chokwang Paint, Co., Ltd., weight average molecular weight: 6,500~7,500 g/mol, OH %: 2.5~3.0%, solid content: 75~80%)
* inorganic particles: silica particles (Nipsil E-220A, Tosoh, Inc., average particle diameter: 1~2 μm)
* antifoaming agent (BYK065, BYK Inc.)
* leveling agent (BYK378 and BYK306, BYK Inc.)
* curing accelerator: dibutyltin laurate
* precipitation stabilizer (MONORAL 5505, HS-CHEM Co., Ltd.)

Preparation of Hardener for Golf Ball Cover Coating Composition

An isocyanate resin, a second solvent, and a second additive were added to an impeller mixer and stirred at 1,000 rpm to prepare each of the hardeners for golf ball cover coating compositions. Types and contents of ingredients of the hardeners for the golf ball cover coating compositions are shown in Table 2 below. In Table 2, a unit of the ingredients is parts by weight.

TABLE 2

|  |  |  | Hardener 1 for golf ball cover coating composition | Hardener 2 for golf ball cover coating composition | Hardener 3 for golf ball cover coating composition |
|---|---|---|---|---|---|
| Isocyanate | Isocyanurate modified hexamethylene diisocyanate | | 40 | — | — |
|  | Polyether modified hexamethylene diisocyanate | | — | 11 | 50 |
|  | Hexamethylene diisocyanate trimer | | — | 59 | — |
| Second additive | Antifouling agent | | 0.4 | 0.4 | 0.4 |
| Second solvent | Aromatic hydrocarbon solvent | Toluene | 19.6 | 14.6 | 19.6 |
|  | Ketone solvent | Methylisobutyl ketone | 20 | 15 | 10 |
|  | Ester solvent | N-butyl acetate | 20 | — | 20 |

*isocyanurate modified hexamethylene diisocyanate (Bayhydur 3100, Bayer MaterialScience Company, NCO %: 16~19%)
*polyether modified hexamethylene diisocyanate (Bayhydur 3300, Bayer MaterialScience Company, NCO %: 20~23%)
*hexamethylene diisocyanate trimer (Burnock DN955, DIC Co., Ltd., NCO %: 5~8%)
*antifouling agent: mixture of ADDITIVE TI (Borchers Co., Ltd.) and OF (Borchers Co., Ltd.) (weight ratio: 50:50)

Preparation of Golf Ball Cover Coating Composition

A mixture of each base for golf ball cover coating compositions, each hardener for golf ball cover coating compositions, and a diluent was added to an impeller mixer and stirred at 1,000 rpm to prepare golf ball cover coating compositions. Types and contents of ingredients used to prepare the golf ball cover coating compositions are shown in Table 3 below. In Table 3, a unit of the ingredients is parts by weight.

TABLE 3

|  | Golf ball cover coating composition 1 | Golf ball cover coating composition 2 | Golf ball cover coating composition 3 | Golf ball cover coating composition 4 |
|---|---|---|---|---|
| Base for golf ball cover coating composition | 1 | 1 | 2 | 3 |
| Hardener for golf ball cover coating composition | 1 | 2 | 3 | 3 |
| Base component:Hardener:Diluent (weight ratio) | 3:1:2 | 3:1:2 | 3:1:2 | 3:1:2 |
| OH %:NCO % | 1:1.06 | 1:1.03 | 1:0.96 | 1:1.03 |

*diluent: methylethyl ketone

Preparation of Sample

Each of the golf ball cover coating compositions was coated on an ionomer resin to a thickness of about 20 μm by using an automatic spray gun (Model-21, BINKS, Inc.). Then, the golf ball cover coating compositions were dried at a temperature of 30 to 50° C. As a result, samples coated with the golf ball cover coating compositions were obtained. The golf ball cover coating compositions, the cover resins, and colors and transparency of samples used in Examples 1 to 4 and Comparative Examples 1 to 4 are shown in Table 4 below.

TABLE 4

| | Golf ball cover coating composition | Cover resin | Color/Transparency of sample |
|---|---|---|---|
| Example 1 | 1 | ionomer resin 1 | yellow/opaque |
| Example 2 | 1 | ionomer resin 2 | yellow/translucent |
| Example 3 | 1 | ionomer resin 3 | white/opaque |
| Example 4 | 1 | standard sample | white/opaque |
| Comparative Example 1 | 3 | ionomer resin 1 | yellow/opaque |
| Comparative Example 2 | 3 | ionomer resin 2 | yellow/translucent |
| Comparative Example 3 | 3 | ionomer resin 3 | white/opaque |
| Comparative Example 4 | 3 | standard sample | white/opaque |

*ionomer resin 1 (mixing ratio: 2 parts by weight of titanium dioxide (Dupont Co., Ltd.) and 0.2 parts by weight of pigment (yellow, Clariant Co., Ltd.), based on 100 parts by weight of Surlyn (Dupont Co., Ltd.))
*ionomer resin 2 (mixing ratio: 0.1 parts by weight of titanium dioxide (Dupont Co., Ltd.) and 0.1 parts by weight of pigment (yellow, Clariant Co., Ltd.), based on 100 parts by weight of Surlyn (Dupont Co., Ltd.))
*ionomer resin 3 (content: 2 parts by weight of titanium dioxide (Dupont Co., Ltd.) based on 100 parts by weight of Surlyn (Dupont Co., Ltd.))
*standard sample (coating test sample, Chokwang Paint, Co., Ltd.)

Preparation of Golf Ball

Each of the golf ball cover coating compositions was coated on each golf ball on which a putting line is printed to a thickness of about 20 μm by using an automatic spray gun (Model-21, BINKS). Then, the golf ball cover coating compositions were dried at a temperature of 30 to 50° C. As a result, golf balls coated with the golf ball cover coating compositions were obtained. Types of the golf ball cover coating compositions and the golf balls used in Examples 5 to 7 and Comparative Examples 5 to 7 are shown in Table 5 below.

TABLE 5

| | Golf ball cover coating composition | Golf ball |
|---|---|---|
| Example 5 | 1 | golf ball A |
| Example 6 | 1 | golf ball B |
| Example 7 | 2 | golf ball C |
| Comparative Example 5 | 3 | golf ball A |
| Comparative Example 6 | 3 | golf ball B |
| Comparative Example 7 | 4 | golf ball D |

*golf ball A (Crystal, Volvik Inc., yellow)
*golf ball B (Crystal, Volvik Inc., orange)
*golf ball C (Crystal, Volvik Inc., pink)
*golf ball D (Crystal, Volvik Inc., green)

Evaluation Example 1: Measurement of Gloss (1) Evaluation Example 1-1: Measurement of Gloss of Sample Gloss of each of the samples prepared according to Examples 1 to 4 and Comparative Examples 1 to 4 was measured at an angle of 60° using a Micro-TRI Gloss meter available from BYK Inc., in accordance with ASTM D523 method. The results are shown in Table 6 below.

Figure 2A:
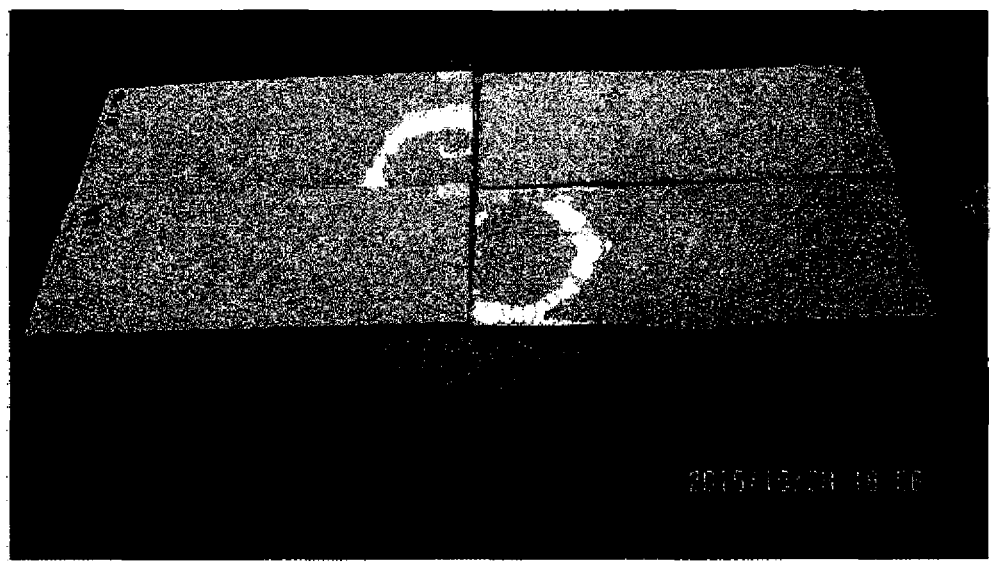
FIG. 2A is a photograph of the samples prepared according to Example 1 and Comparative Example 1 obtained by using a camera (IXUS 145, Canon) in which the samples prepared according to Example 1, Comparative Example 1, Example 1, and Comparative Example 1 are shown in clockwise order from the upper right sample.

FIG. 2A is a photograph of the samples prepared according to Example 1 and Comparative Example 1 obtained by using a camera (IXUS 145, Canon). The samples prepared according to Example 1, Comparative Example 1, Example 1, and Comparative Example 1 are shown in clockwise order from the upper right sample.

Figure 2B:
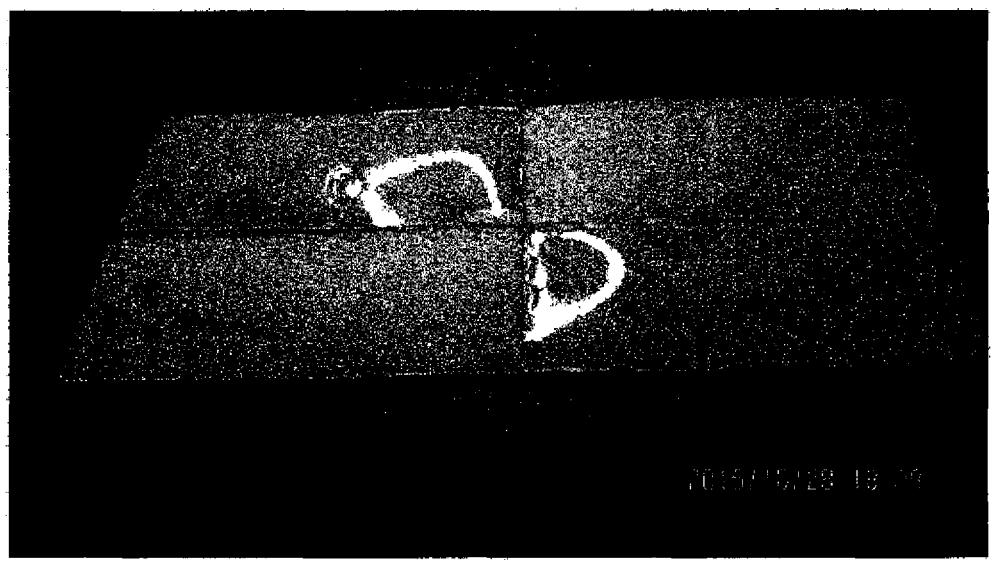
FIG. 2B is a photograph of the samples prepared according to Example 2 and Comparative Example 2 obtained by using the camera (IXUS 145, Canon) in which the samples prepared according to Example 2, Comparative Example 2, Example 2, and Comparative Example 2 are shown in clockwise order from the upper right sample.

FIG. 2B is a photograph of the samples prepared according to Example 2 and Comparative Example 2 obtained by using the camera (IXUS 145, Canon). The samples prepared according to Example 2, Comparative Example 2, Example 2, and Comparative Example 2 are shown in clockwise order from the upper right sample.

Figure 2C:
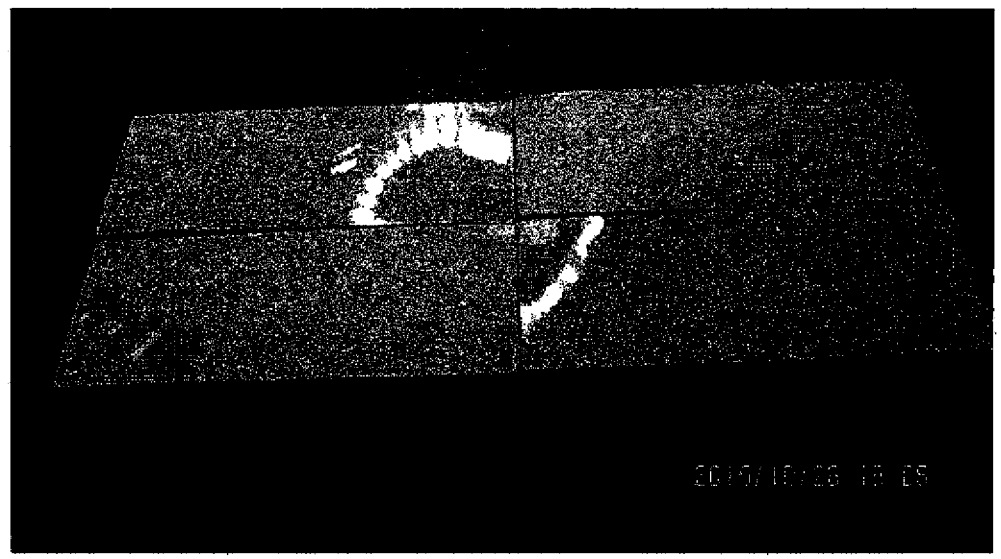
FIG. 2C is a photograph of the samples prepared according to Example 3 and Comparative Example 3 obtained by using the camera (IXUS 145, Canon), in which the samples prepared according to Example 3, Comparative Example 3, Example 3, and Comparative Example 3 are shown in clockwise order from the upper right sample.

FIG. 2C is a photograph of the samples prepared according to Example 3 and Comparative Example 3 obtained by using the camera (IXUS 145, Canon). The samples prepared according to Example 3, Comparative Example 3, Example 3, and Comparative Example 3 are shown in clockwise order from the upper right sample.

Figure 2D:
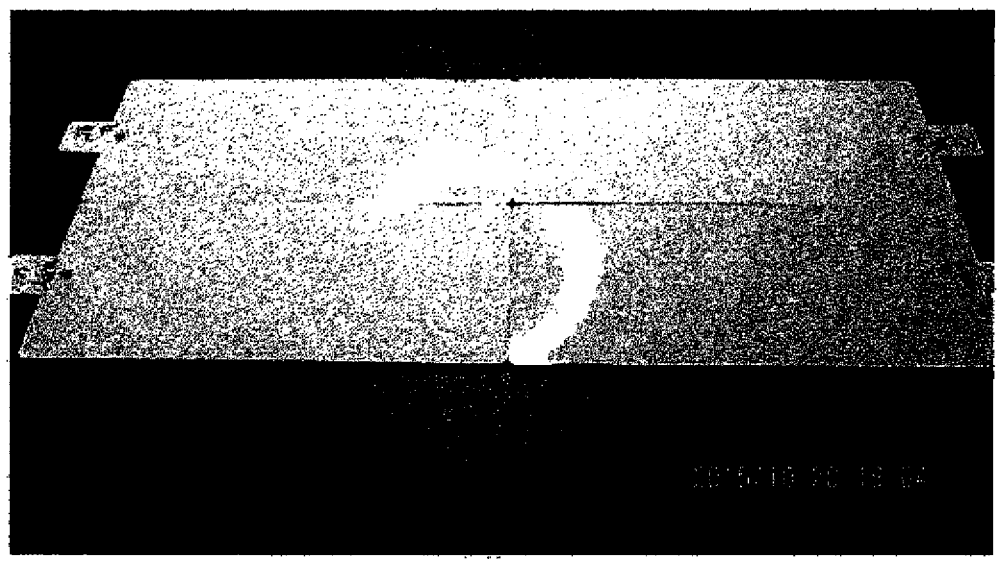
FIG. 2D is a photograph of the samples prepared according to Example 4 and Comparative Example 4 obtained by using the camera (IXUS 145, Canon), in which the samples prepared according to Example 4, Comparative Example 4, Example 4, and Comparative Example 4 are shown in clockwise order from the upper right sample.

FIG. 2D is a photograph of the samples prepared according to Example 4 and Comparative Example 4 obtained by using the camera (IXUS 145, Canon). The samples prepared according to Example 4, Comparative Example 4, Example 4, and Comparative Example 4 are shown in clockwise order from the upper right sample.

TABLE 6

| | Gloss |
|---|---|
| Example 1 | 5~5.5 |
| Example 2 | 4.3~4.4 |
| Example 3 | 4 |
| Example 4 | 4 |
| Comparative Example 1 | 96 |
| Comparative Example 2 | 80~85 |
| Comparative Example 3 | 95 |
| Comparative Example 4 | 95 |

As shown in Table 6 and FIGS. 2A to 2D, it may be confirmed that the samples coated with the golf ball cover coating compositions prepared according to Examples 1 to 4 and having a gloss of 5.5 or less exhibited lower external light reflectance than the samples coated with the golf ball cover coating compositions prepared according to Comparative Examples 1 to 4 and having a gloss of 80 or greater regardless of color and transparency of the samples.

(2) Evaluation Example 1-2: Measurement of Gloss of Golf Ball

Gloss of each of the golf balls prepared according to Examples 5 and 6 and Comparative Examples 5 and 6 was visually observed and evaluated according to the following criteria. The results are shown in Table 7 below.

Fine: The putting line printed on the golf ball was clearly visible.

Poor: The putting line printed on the golf ball was not clearly visible.

Figure 3A:
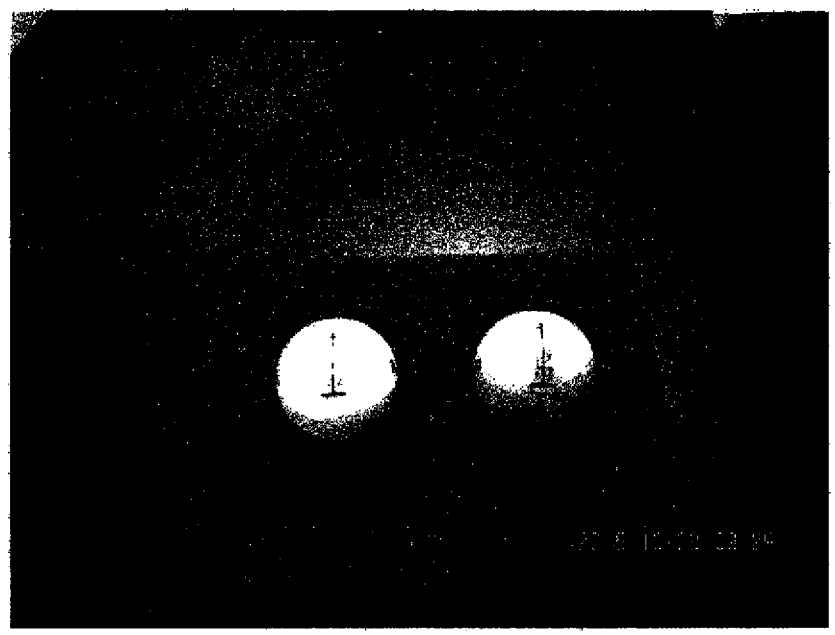
FIG. 3A is a photograph of golf balls prepared according to Examples 5 and 6 obtained by using the camera (IXUS 145, Canon), in which a left golf ball is prepared according to Example 5 and a right golf ball is prepared according to Example 6.

FIG. 3A is a photograph of golf balls prepared according to Examples 5 and 6 obtained by using the camera (IXUS 145, Canon). A left golf ball is prepared according to Example 5 and a right golf ball is prepared according to Example 6.

Figure 3B:
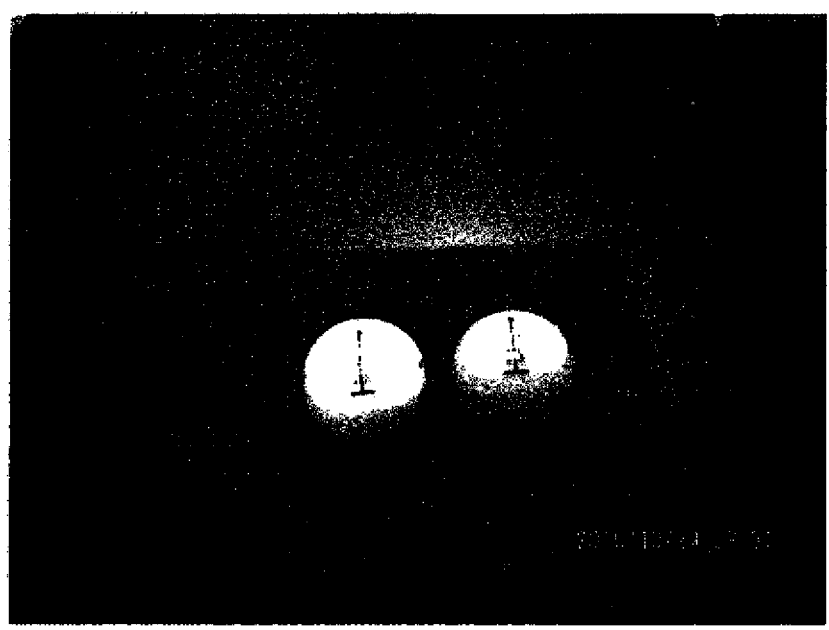
FIG. 3B is a photograph of golf balls prepared according to Comparative Examples 5 and 6 obtained by using the camera (IXUS 145, Canon) in which a left golf ball is prepared according to Comparative Example 5 and a right golf ball is prepared according to Comparative Example 6.

FIG. 3B is a photograph of golf balls prepared according to Comparative Examples 5 and 6 obtained by using the camera (IXUS 145, Canon). A left golf ball is prepared according to Comparative Example 5 and a right golf ball is prepared according to Comparative Example 6.

TABLE 7

| Example 5 | fine |
|---|---|
| Example 6 | fine |
| Comparative Example 5 | poor |
| Comparative Example 6 | poor |

As shown in Table 7 and FIGS. 3A and 3B, it may be confirmed that since the golf balls prepared according to Examples 5 and 6 exhibited lower external light reflectance than the golf balls prepared according to Comparative Examples 5 and 6, the putting lines printed on the golf balls prepared according to Examples 5 and 6 are more clearly visible.

Evaluation Example 2: Measurement of Cutting Resistance

To evaluate cutting resistance, a professional golfer hit the golf balls prepared according to Examples 5 and 7 and Comparative Example 7 at a speed of 75 mph at the logo portion three times using a #9 iron, respectively. Then, cutting resistance of each golf ball was evaluated according to the following process.

(1) Evaluation Example 2-1: Visual Observation and Tactile Examination

The surface of each golf ball was visually observed and subject to tactile examination and evaluated according to the following criteria. The results are shown in Table 8 below.
Fine: Trivial damage was visually observed, and less fluff-like fragments and less scratches were found on the surface.
Poor: Large damage was visually observed, and more fluff-like fragments and more scratches were found on the surface.

(2) Evaluation Example 2-2: Measurement of Depth of Damaged Portion

Figure 4A:
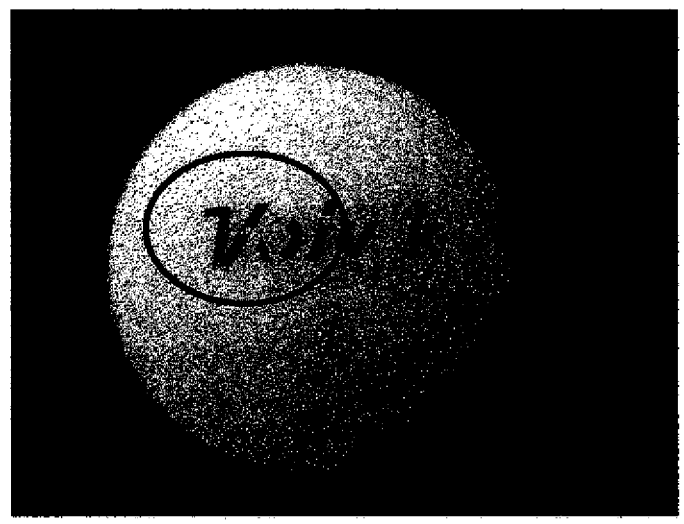
FIG. 4A is a photograph of a surface of a golf ball prepared according to Example 5 obtained by using the camera (IXUS 145, Canon), after a professional golfer hits the golf ball at a speed of 75 mph at a logo portion three times using a nine iron.
Figure 4B:
FIG. 4B is an image of a portion of FIG. 4A marked with a red circle obtained by using the digital electron microscope (AM-313, Dino-lite, Inc., magnification: ×10).
Figure 4C:
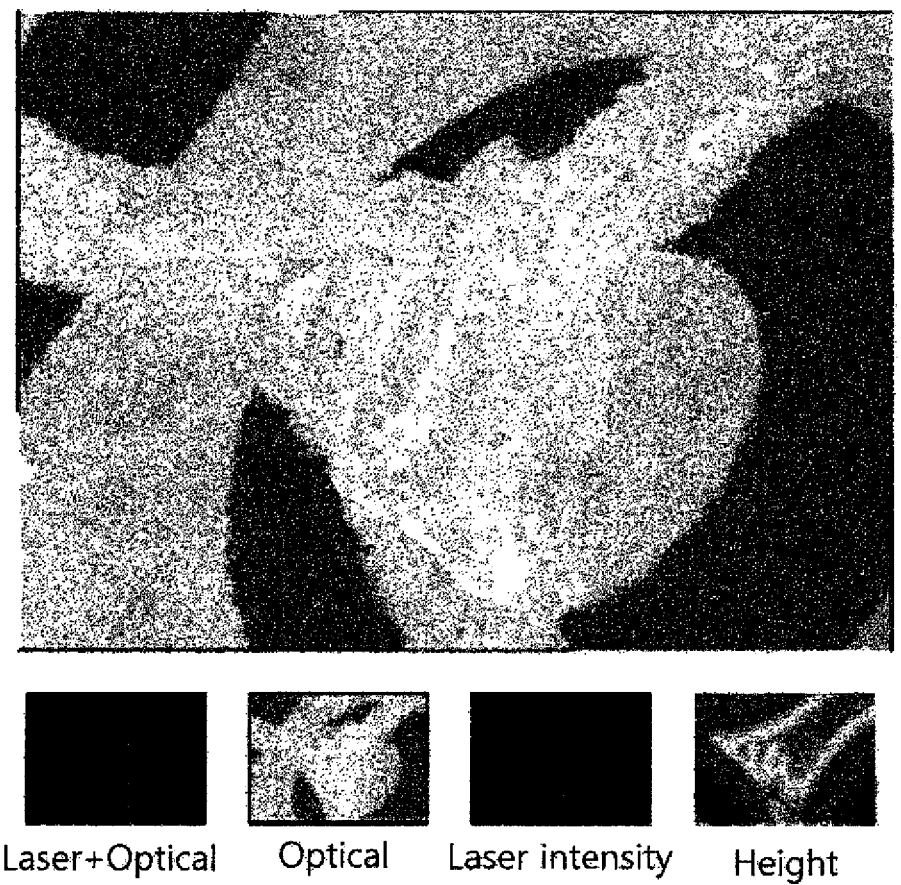
FIG. 4C is an image of a portion of FIG. 4B marked with a red circle obtained by using the 3D electron microscope (VK-X200, Keyence Corp., magnification: ×100).
Figure 4D:
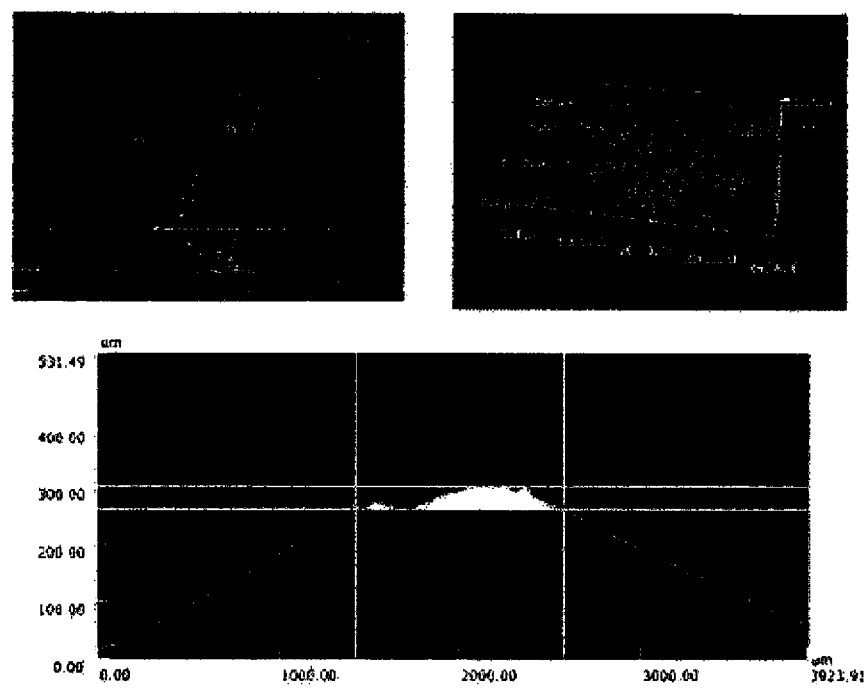
FIG. 4D is a view schematically illustrating a process of measuring a depth of a damaged portion of FIG. 4B marked with the red circle by using the 3D electron microscope (VK-X200, Keyence Corp., magnification: ×100).

Depth of a damaged portion of the coating layer and the cover of each golf ball was measured using a three-dimensional (3D) electron microscope (VK-X200, Keyence Corp., magnification: ×100). The results are shown in Table 8.
FIG. 4A is a photograph of a surface of a golf ball prepared according to Example 5 obtained by using the camera (IXUS 145, Canon), after a professional golfer hits the golf ball at a speed of 75 mph at the logo portion three times using a #9 iron. FIG. 4B is an image of a portion of FIG. 4A marked with a red circle obtained by using the digital electron microscope (AM-313, Dino-lite, Inc., magnification: ×10). FIG. 4C is an image of a portion of FIG. 4B marked with a red circle obtained by using the 3D electron microscope (VK-X200, Keyence Corp., magnification: ×100) in four modes (laser+optical, optical, laser intensity, and height). An upper image of FIG. 4C is obtained in optical mode, and lower images sequentially shown from the left are obtained in laser+optical mode, in optical mode, in laser intensity mode, and in height mode, respectively. FIG. 4D is a view schematically illustrating the process of measuring the depth of a damaged portion of FIG. 4B marked with the red circle by using the 3D electron microscope (VK-X200, Keyence Corp., magnification: ×100). In FIG. 4D, an upper left image illustrates a process of displaying a damaged portion subject to depth measurement after acquiring the image in laser intensity mode. In FIG. 4D, the upper right image illustrates a 3D mode image obtained in laser intensity mode. A lower image of FIG. 4D illustrates a process of calculating the width (Horz. dist.) and the height (Hght. diff.) of the portion of the upper left image marked with a yellow solid line.

Figure 5A:
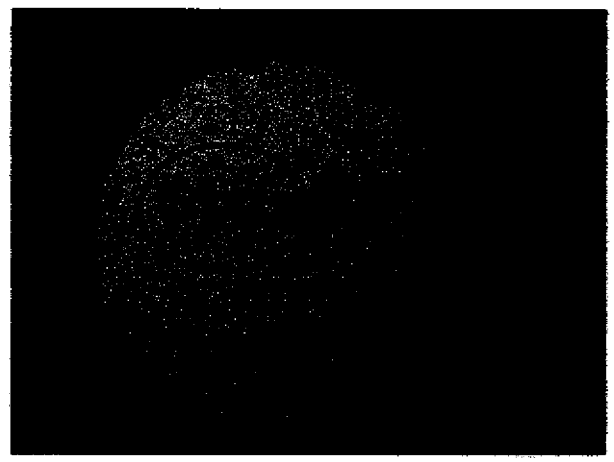
FIG. 5A is a photograph of a surface of a golf ball prepared according to Example 7 obtained by using the camera (IXUS 145, Canon), after a professional golfer hits the golf ball at a speed of 75 mph at a logo portion three times using a nine iron.
Figure 5B:
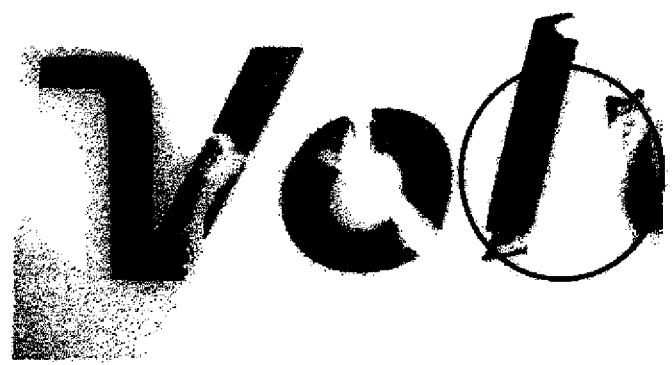
FIG. 5B is an image of a portion of FIG. 5A marked with a red circle obtained by using the digital electron microscope (AM-313, Dino-lite, Inc., magnification: ×10).
Figure 5C:
FIG. 5C is an image of a portion of FIG. 5B marked with a red circle obtained by using the 3D electron microscope (VK-X200, Keyence Corp., magnification: ×100).
Figure 5C:
Figure 5C:
Figure 5C:
Figure 5C:
Figure 5D:
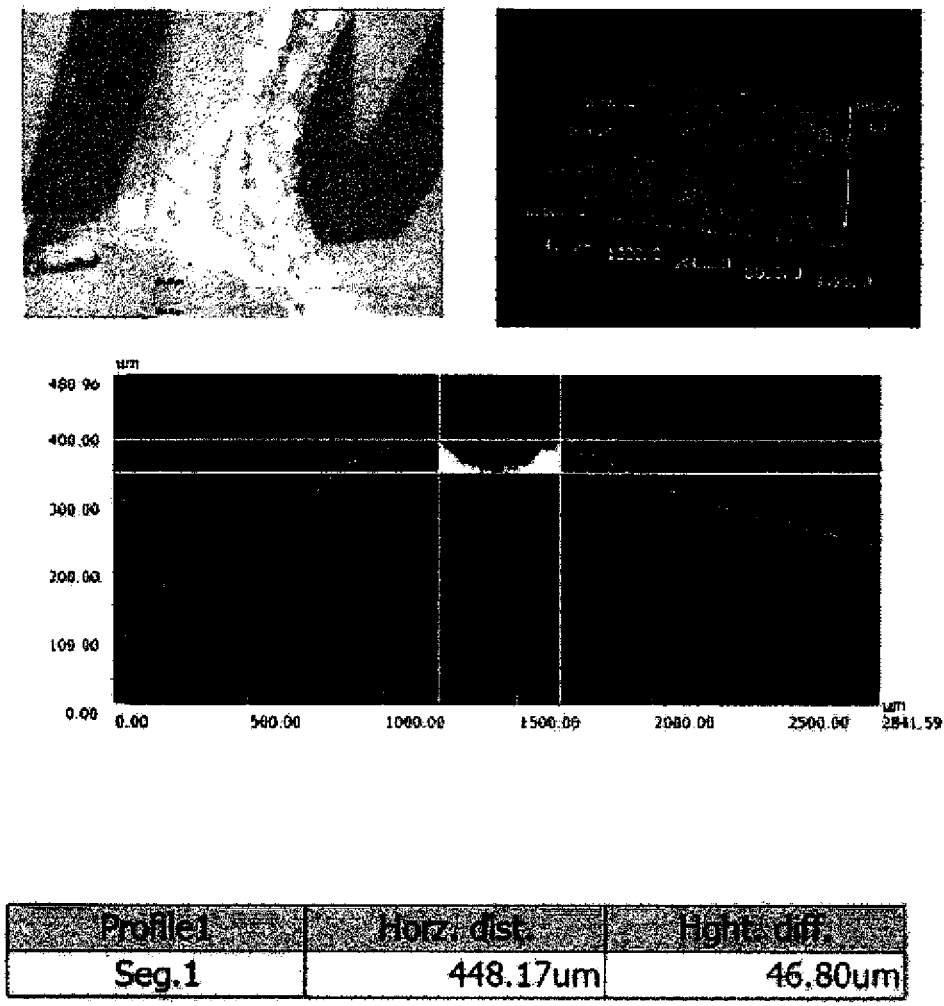
FIG. 5D is a view schematically illustrating a process of measuring a depth of a damaged portion of FIG. 5B marked with the red circle by using the 3D electron microscope (VK-X200, Keyence Corp., magnification: ×100).

FIG. 5A is a photograph of a surface of a golf ball prepared according to Example 7 obtained by using the camera (IXUS 145, Canon), after a professional golfer hits the golf ball at a speed of 75 mph at a logo portion three times using a #9 iron. FIG. 5B is the image of the portion of FIG. 5A marked with a red circle obtained by using the digital electron microscope (AM-313, Dino-lite, Inc., magnification: ×10). FIG. 5C is the image of the portion of FIG. 5B marked with a red circle obtained by using the 3D electron microscope (VK-X200, Keyence Corp., magnification: ×100) in four modes (laser+optical, optical, laser intensity, and height). An upper image of FIG. 5C is obtained in optical mode, and lower images sequentially shown from the left are obtained in laser+optical mode, in optical mode, in laser intensity mode, and in height mode, respectively. FIG. 5D is a view schematically illustrating a process of measuring a depth of a damaged portion of FIG. 5B marked with the red circle by using the 3D electron microscope (VK-X200, Keyence Corp., magnification: ×100). In FIG. 5D, an upper left image illustrates a process of displaying a damaged portion subject to depth measurement after acquiring the image in laser intensity mode. In FIG. 5D, an upper right image illustrates a 3D mode image obtained in laser intensity mode. A lower image of FIG. 5D illustrates a process of calculating a width (Horz. dist.) and a height (Hght. diff.) of the portion of the upper left image marked with a yellow solid line.

Figure 6B:
FIG. 6B is an image of a portion of FIG. 6A marked with a red circle obtained by using the digital electron microscope (AM-313, Dino-lite, Inc., magnification: ×10).
Figure 6C:
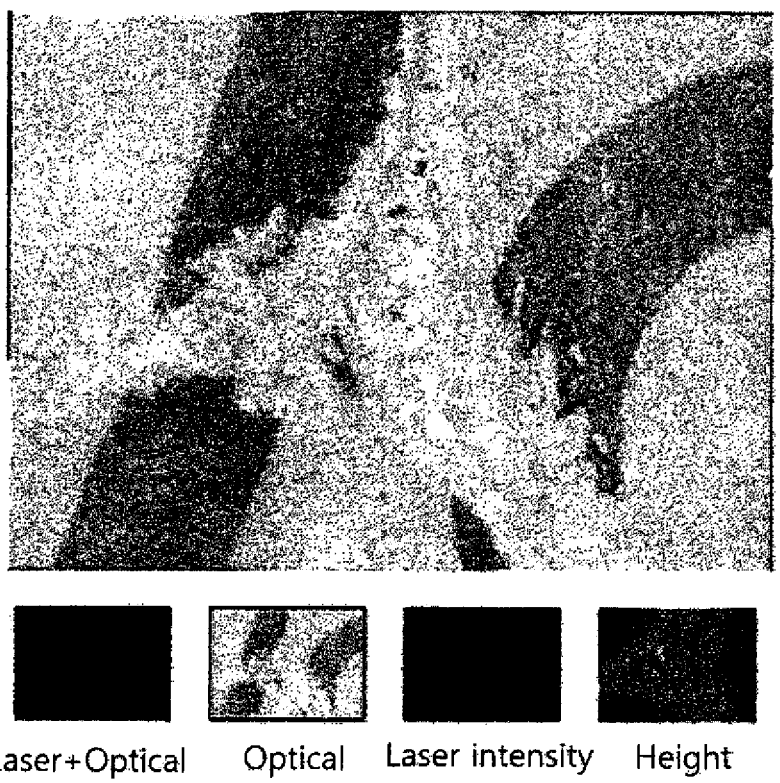
FIG. 6C is an image of a portion of FIG. 6B marked with a red circle obtained by using the 3D electron microscope (VK-X200, Keyence Corp., magnification: ×100).
Figure 6D:
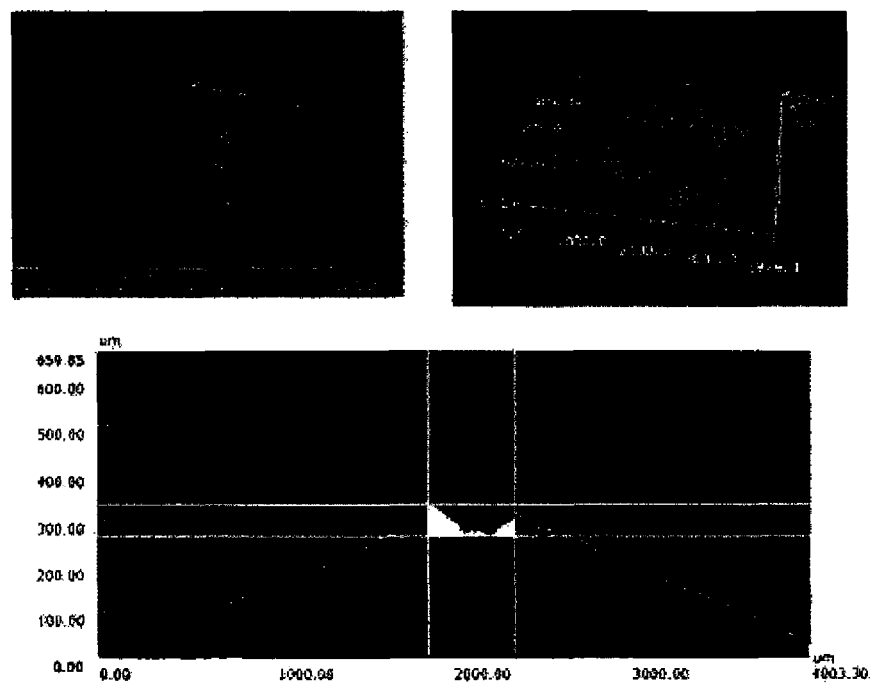
FIG. 6D is a view schematically illustrating a process of measuring a depth of a damaged portion of FIG. 6B marked with the red circle by using the 3D electron microscope (VK-X200, Keyence Corp., magnification: ×100).

FIG. 6A is a photograph of a surface of a golf ball prepared according to Comparative Example 7 obtained by using the camera (IXUS 145, Canon), after a professional golfer hits the golf ball at a speed of 75 mph at the logo portion three times using a #9 iron. FIG. 6B is an image of a portion of FIG. 6A marked with a red circle obtained by using the digital electron microscope (AM-313, Dino-lite, Inc., magnification: ×10). FIG. 6C is an image of a portion of FIG. 6B marked with a red circle obtained by using the 3D electron microscope (VK-X200, Keyence Corp., magnification: ×100) in four modes (laser+optical, optical, laser intensity, and height). The upper image of FIG. 6C is obtained in optical mode, and lower images sequentially shown from the left are obtained in laser+optical mode, in optical mode, in laser intensity mode, and in height mode, respectively. FIG. 6D is a view schematically illustrating a process of measuring a depth of a damaged portion of FIG. 6B marked with the red circle by using the 3D electron microscope (VK-X200, Keyence Corp., magnification: ×100). In FIG. 6D, the upper left image illustrates a process of displaying a damaged portion subject to depth measurement after acquiring the image in laser intensity mode. In FIG. 6D, the upper right image illustrates a 3D mode image obtained in laser intensity mode. A lower image of FIG. 6D illustrates a process of calculating a width (Horz. dist.) and a height (Hght. diff.) of the portion of the upper left image marked with a yellow solid line.

TABLE 8

|  | Example 5 | Example 7 | Comparative Example 7 |
|---|---|---|---|
| Visual observation and tactile examination | fine | fine | poor |
| Depth of damaged portion | 38.41 μm | 46.80 μm | 66.90 μm |

As shown in Table 8, FIGS. 4A to 4D, FIGS. 5A to 5D, and FIGS. 6A to 6D, it may be confirmed that the golf balls prepared according to Examples 5 and 7 have better cutting resistance than the golf ball prepared according to Comparative Example 7. Thus, it is confirmed that the modified polyester polyol resin increases viscoelasticity of the coating layer in the golf balls prepared according to Examples 5 and 7, and thus the coating layer protects the cover from strong external impact by the iron.

Examples 11 to 14 and Comparative Examples 11 to 16

Preparation of Base for Golf Ball Cover Coating

Golf ball cover coating compositions 11 to 15 were prepared in the same manner as in Example 1, except that silica particles, as the inorganic particles, having specific surface areas, which are different from that of the base 1 for golf ball cover coating composition included in the golf ball cover coating composition 1 used to prepare the sample according to Example 1, were used as shown in Table 9 below. Inorganic particles used to prepare each of the golf ball cover coating compositions and viscosity of the prepared compositions are shown in Table 9 below.

Workability was evaluated according to the following criteria.

○: Despite slight increase in viscosity by addition of inorganic particles, easy mixing and spray-coating of compositions and easy preparation of samples.

◉: No change in viscosity by addition of inorganic particles, very easy mixing and spray-coating of compositions, and easy preparation of samples.

X: Rapid increase in viscosity by addition of inorganic particles, difficult mixing and spray-coating of compositions, and impossible preparation of samples.

As shown in Table 9, the golf ball cover coating composition 13 is unsuitable for spray-coating due to low workability caused by increase in viscosity.

Preparation of Sample

Samples according to Examples 11 and 12 and Comparative Examples 11 to 13 were prepared in the same manner as in Example 4, except that the golf ball cover coating compositions 11 to 15 prepared as described above were used instead of the golf ball cover coating composition 1.

Compositions and cover resins used to prepare samples are shown in Table 10 below. Uniform coating of the sample according to Comparative Example 13 was impossible due to increased viscosity of the composition as described above.

TABLE 10

|  | Golf ball cover coating composition | cover resin |
|---|---|---|
| Comparative Example 11 | 11 | standard sample |
| Comparative Example 12 | 12 | standard sample |
| Comparative Example 13 | 13 | standard sample |
| Example 11 | 14 | standard sample |
| Example 12 | 15 | standard sample |

Preparation of Golf Ball

Golf balls according to Examples 13 and 14 and Comparative Examples 14 to 16 were prepared in the same manner as in Example 5, except that the golf ball cover coating compositions 11 to 15 prepared as described above were used instead of the golf ball cover coating composition 1.

Compositions used to prepare the golf balls and uncoated golf balls are shown in Table 11 below. Uniform coating was impossible on the golf ball according to Comparative Example 16, due to increased viscosity of the composition.

TABLE 11

|  | Golf ball cover coating composition | Golf ball |
|---|---|---|
| Comparative Example 14 | 11 | golf ball A |
| Comparative Example 15 | 12 | golf ball A |
| Comparative Example 16 | 13 | golf ball A |

TABLE 9

|  | Particle diameter of silica particles [μm] | Specific surface area of silica particles [m²/g] | Content of silica particles [parts by weight] | Workability |
|---|---|---|---|---|
| Golf ball cover coating composition 11 | 5 | less than 50 | 20 | ○ |
| Golf ball cover coating composition 12 | 1~1.7 | 55 | 12 | ◉ |
| Golf ball cover coating composition 13 | 2.1 | 220 | 9.5 | X |
| Golf ball cover coating composition 14 | 1~2 | 150 | 10 | ○ |
| Golf ball cover coating composition 15 | 2.1 | 170 | 10 | ○ |

TABLE 11-continued

| | Golf ball cover coating composition | Golf ball |
|---|---|---|
| Example 13 | 14 | golf ball A |
| Example 14 | 15 | golf ball A |

Evaluation Example 3-1: Measurement of Gloss

Gloss of each of the coated samples prepared according to Examples 11 and 12 and Comparative Examples 11 and 12 was measured in the same manner as in Evaluation Example 1-1 above. The results are shown in Table 12 below.

Comparative Example 13 was excluded due to non-uniform surface coating.

TABLE 12

| | Gloss of Sample |
|---|---|
| Comparative Example 11 | 60 |
| Comparative Example 12 | 3.1 |
| Example 11 | 2.4 |
| Example 12 | 2.5 |

As shown in Table 12, the samples according to Example 11 and 12 exhibited far lower external light reflectance than the samples according to Comparative Examples 11 and 12.

Evaluation Example 3-2: Measurement of Gloss of Golf Ball

Gloss of each of the golf balls prepared according to Examples 13 and 14 and Comparative Examples 14 to 16 was visually observed and evaluated according to the same criteria described above in Evaluation Example 1-2. The results are shown in Table 13 below.

Comparative Example 16 was excluded due to non-uniform surface coating.

TABLE 13

| | Gloss of Golf ball |
|---|---|
| Comparative Example 14 | poor |
| Comparative Example 15 | poor |
| Example 13 | fine |
| Example 14 | fine |

As shown in Table 13, since the golf balls according to Examples 13 and 14 exhibited lower external light reflectance than the golf balls according to Comparative Examples 14 and 15, the putting lines printed on the golf balls of Examples 13 and 14 are more clearly visible.

Evaluation Example 4: Measurement of Cutting Resistance of Golf Ball

Visual observation and tactile examination were performed on the golf balls prepared according to Examples 13 and 14 and Comparative Examples 14 to 16 in the same manner as in Evaluation Example 2-1 and depths of damaged portions were measured in the same manner as in Evaluation Example 2-2. The results are shown in Table 14 below.

TABLE 14

| | Visual observation and tactile examination | Depth of damaged portion |
|---|---|---|
| Comparative Example 14 | poor | 38.56 um |
| Comparative Example 15 | poor | 32.29 um |
| Comparative Example 16 | poor | 36.83 um |
| Example 13 | fine | 15.33 um |
| Example 14 | fine | 15.27 um |

As shown in Table 13, since the golf balls according to Examples 13 and 14 had less surface damages and less depths of damaged portions than the golf balls according to Comparative Examples 14 to 16, cutting resistance of the golf balls according to Examples 13 and 14 was improved.

Evaluation Example 5: Measurement of Flight Distance of Golf Ball

The coated golf balls prepared according to Examples 13 and 14 and Comparative Examples 14 to 16 were hit by using a hitting machine at a head speed of 90 mph, and flight distances thereof were measured by using a flight distance measuring device.

A hitting machine manufactured by Golf Laboratories, Inc., was used and the flight distance was measured by using a TrackMan that is a Doppler radar-based measuring device. Some measurement results are shown in Table 15 below.

TABLE 15

| | Flight distance [meter] |
|---|---|
| Comparative Example 15 | 183.2 |
| Comparative Example 16 | 182.4 |
| Example 13 | 183.7 |

As shown in Table 15, the golf ball according to Example 13 exhibited a longer flight distance than the golf ball according to Comparative Example 15. Meanwhile, the golf ball according to Comparative Example 16 exhibited a far shorter flight distance due to non-uniform surface since the surface of the golf ball is not uniformly coated.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

EXPLANATION OF REFERENCE NUMERALS

10 golf ball
100 core
200 cover
300 dimples
400 coating layer

INDUSTRIAL APPLICABILITY

As described above, according to the one or more of the above exemplary embodiments, since the golf ball cover coating composition includes the base having the inorganic particles, the coating layer formed of the composition may have low external light reflectance and low gloss. Accordingly, the surface of the golf ball having the coating layer has very low gloss, thereby reducing influence of external light on a golfer during outdoor use thereof and increasing concentration and performance of the golfer.

Since the golf ball cover coating composition includes the base having the highly flexible modified polyester polyol resin, the coating layer formed of the composition may have excellent impact resistance, cutting resistance, scratch resistance, and rebound resilience. Thus, the golf ball having the coating layer may be less damaged by external impact, and accordingly flight distance and spin performance of the golf ball may be maintained regardless of hours of use.

The invention claimed is:

1. A golf ball cover coating composition comprising:
a base and a hardener,
wherein:
the base comprises a caprolactone modified polyester polyol resin and inorganic particles,
the hardener comprises a polyisocyanate having at least two isocyanate groups,
the inorganic particles comprise powdered silica particles having an average particle diameter of 1 to 15 µm,
the powdered silica particles have a specific surface area of 100 to 200 m$^2$/g,
a content of the inorganic particles is in a range of 5 to 20 parts by weight based on 100 parts by weight of a total weight of the base, and
the caprolactone modified polyester polyol resin is an aliphatic polyester polyol resin comprising an aliphatic polybasic acid, an aliphatic polyhydric alcohol, and a repeating unit derived from caprolactone,
wherein the caprolactone modified polyester polyol resin has a weight average molecular weight of 5,000 to 25,000 g/mol and a content of hydroxyl groups (OH %) in a range of 1.0 to 5.0% by mass.

2. The golf ball cover coating composition of claim 1, wherein the base further comprises a first solvent comprising at least one selected from the group consisting of an aromatic hydrocarbon solvent, a ketone solvent, and an ester solvent.

3. The golf ball cover coating composition of claim 1, wherein the base further comprises an elasticity-imparting agent comprising at least one selected from the group consisting of polybutadiene rubber, polystyrene rubber, polyurethane rubber, silicon modified urethane resin, silicon modified polyester resin, polyester modified silicon resin, and silicon modified epoxy resin.

4. The golf ball cover coating composition of claim 1, wherein the polyisocyanate comprises at least one selected from the group consisting of 2,4-toluene diisocyanate (2,4-TDI), 2,6-toluene diisocyanate (2,6-TDI), diphenylmethane-4,4'-diisocyanate (4,4'-MDI), diphenylmethane-2,4-diisocyanate (2,4-MDI), diphenylmethane-2,2'-diisocyanate (2,2'-MDI), 1,6-hexamethylene diisocyanate (1,6-HDI), 2,2,4(2,4,4)-trimethyl hexamethylene diisocyanate (2,2,4(2,4,4)-TMDI), p-phenylene diisocyanate (PPDI), 4,4'-dicyclohexyl methane diisocyanate (HMDI), m-xylene diisocyanate (XDI), isophorone diisocyanate (IPDI), 1,5-naphthalene diisocyanate (NDI), trans-1,4-cyclohexyl diisocyanate (CHDI), isocyanurate modified hexamethylene diisocyanate, and polyether modified hexamethylene diisocyanate.

5. The golf ball cover coating composition of claim 1, wherein the polyisocyanate has a content of isocyanate groups (NCO %) in a range of 5 to 23% by mass.

6. The golf ball cover coating composition of claim 1, wherein a content of the polyisocyanate is in a range of 30 to 75 parts by weight based on 100 parts by weight of a total weight of the hardener.

7. The golf ball cover coating composition of claim 1, wherein the hardener further comprises a solvent comprising at least one selected from the group consisting of an aromatic hydrocarbon solvent, a ketone solvent, and an ester solvent.

8. The golf ball cover coating composition of claim 1, wherein a weight ratio of the base to the hardener is in a range of 5:1 to 1:1.

9. The golf ball cover coating composition of claim 1, wherein an equivalent ratio of a content of hydroxyl groups (OH %):a content of isocyanate groups (NCO %) is from 1:1.03 to 1:1.06.

10. A golf ball formed by using the golf ball cover coating composition according to claim 1.

11. The golf ball of claim 10, wherein a gloss of the golf ball measured at 60° in accordance with the ASTM D523 method is in a range of 0.1 to 20.

12. The golf ball of claim 10, wherein a gloss of the golf ball measured at 60° in accordance with the ASTM D523 method is in a range of 0.1 to 5.

13. The golf ball of claim 10, wherein the golf ball has a color defined by x and y coordinates of a CIE 1931 color space chromaticity diagram or a mixed color of at least two colors.

14. The golf ball cover coating composition of claim 1, wherein a content of the caprolactone modified polyester polyol resin is in a range of 25 to 85 parts by weight based on 100 parts by weight of a total weight of the base.

* * * * *